United States Patent
Oda et al.

(10) Patent No.: US 10,836,780 B2
(45) Date of Patent: Nov. 17, 2020

(54) POLYFLUOROALKYL PHOSPHORIC ACID ESTER OR SALT THEREOF, AND MOLD-RELEASING AGENT COMPRISING THE SAME AS AN ACTIVE INGREDIENT

(71) Applicant: UNIMATEC CO., LTD., Tokyo (JP)

(72) Inventors: Yuichiro Oda, Ibaraki (JP); Yoshiyama Kaneumi, Ibaraki (JP)

(73) Assignee: UNIMATEC CO., LTD, Tokyo (JP)

( * ) Notice: Subject to any disclaimer, the term of this patent is extended or adjusted under 35 U.S.C. 154(b) by 0 days.

(21) Appl. No.: 16/486,031

(22) PCT Filed: Mar. 20, 2018

(86) PCT No.: PCT/JP2018/010958
§ 371 (c)(1),
(2) Date: Aug. 14, 2019

(87) PCT Pub. No.: WO2018/174041
PCT Pub. Date: Sep. 27, 2018

(65) Prior Publication Data
US 2020/0048287 A1    Feb. 13, 2020

(30) Foreign Application Priority Data

Mar. 22, 2017  (JP) ................. 2017-056143

(51) Int. Cl.
*C07F 9/09*   (2006.01)
(52) U.S. Cl.
CPC .................... *C07F 9/091* (2013.01)
(58) Field of Classification Search
CPC ..................................... C07F 9/091
See application file for complete search history.

(56) References Cited

U.S. PATENT DOCUMENTS

| | | |
|---|---|---|
| 2009/0036706 A1 | 2/2009 | Murata et al. |
| 2009/0038510 A1 | 2/2009 | Acosta et al. |
| 2011/0009555 A1 | 1/2011 | Kurihara et al. |
| 2011/0315050 A1 | 12/2011 | Kaneumi et al. |

FOREIGN PATENT DOCUMENTS

| | | |
|---|---|---|
| EP | 2407472 A1 | 1/2012 |
| JP | 52-036588 | 3/1977 |
| JP | 52-039587 | 3/1977 |
| JP | 55-133490 | 10/1980 |
| JP | 59-166596 | 9/1984 |
| JP | 60-190309 | 9/1985 |
| JP | 60-193615 | 10/1985 |
| JP | 07-278162 | 10/1995 |
| JP | H09-316088 A | 12/1997 |
| WO | WO 2007/105633 A1 | 9/2007 |
| WO | WO 2009/034773 A1 | 3/2009 |
| WO | WO 2010/104065 A1 | 9/2010 |

OTHER PUBLICATIONS

International Search Report from corresponding PCT application No. PCT/JP2018/010958 dated Jun. 19, 2018 (6 pgs).
International Preliminary Report on Patentability and Written Opinion from corresponding PCT application No. PCT/JP2018/010958 dated Sep. 24, 2019 (7 pgs).

*Primary Examiner* — Karen Cheng

(57) ABSTRACT

A polyfluoroalkyl phosphoric acid ester represented by the general formula $[C_nF_{2n+1}(CH_2CF_2)_a(CF_2CF_2)_b(CH_2CH_2)_cO]_mP(O)(OH)_{3-m}$ [I] n: 1 to 6, a: 1 to 4, b: 1 to 3, c: 1 to 3, m: 1 to 3) or a salt thereof. The polyfluoroalkyl phosphoric acid ester represented by the general formula [I] is produced by subjecting a polyfluoroalkyl alcohol represented by the general formula $C_nF_{2n+1}(CH_2CF_2)_a(CF_2CF_2)_b(CH_2CH_2)_cOH$ [II] (n: 1 to 6, a: 1 to 4, b: 1 to 3, c: 1 to 3) to a dehydration condensation reaction with phosphoric acid. The polyfluoroalkyl phosphoric acid ester can be easily synthesized without passing through dialkyl ester as in the case of phosphonic acid, and used for a mold-releasing agent comprising the same or a salt thereof as an active ingredient.

6 Claims, No Drawings

POLYFLUOROALKYL PHOSPHORIC ACID ESTER OR SALT THEREOF, AND MOLD-RELEASING AGENT COMPRISING THE SAME AS AN ACTIVE INGREDIENT

RELATED APPLICATION

This application is a 35 U.S.C. § 371 national phase filing of International Patent Application No. PCT/JP2018/010958, filed Mar. 20, 2018, which claims priority under 35 U.S.C. § 119 to Japanese Patent Application No. 2017-056143, filed Mar. 22, 2017, the entire disclosures of each which are hereby expressly incorporated by reference.

TECHNICAL FIELD

The present invention relates to a polyfluoroalkyl phosphoric acid ester or a salt thereof, and a mold-releasing agent comprising the same as an active ingredient. More particularly, the present invention relates to a polyfluoroalkyl phosphoric acid ester or a salt thereof, which can be easily synthesized, and a mold-releasing agent comprising the same as an active ingredient.

BACKGROUND ART

Patent Documents 1 to 3 each disclose a mold-releasing agent comprising, as a main component, a perfluoroalkyl alkyl phosphoric acid ester (salt) that does not have a $(CH_2CF_2)_a$ unit, to which is added at least one of a surfactant, silicone oil, and a highly fluorinated organic compound having a boiling point of 100° C. or more, or silicone varnish.

These mold-releasing agents exhibit excellent mold releasability and have a longer mold release life than conventional ones; however, as the shape of molded products becomes more complicated in recent years, the mold-releasing agents are required to achieve much higher performance. Moreover, addition of a surfactant or a silicone-based substance is required to improve mold release performance and to prolong the mold release life. None of these documents reference to any method for producing a phosphoric acid ester.

Patent Document 4 indicates that perfluoroalkyl alkylene phosphonic acid (salt) can also form, together with wax, a mold-releasing agent. Patent Documents 5 and 6 indicate that a monohydrocarbon ester (salt) of polyfluoroalkyl alkylene phosphonic acid or a monohydrocarbon ester (salt) of phosphonic acid having an oxyarylene group binding to a hexafluoropropene oligomer residue can also similarly form, together with wax or oil having a melting point of 100° C. or less, a mold-releasing agent.

Furthermore, Patent Document 7, which was filed by the present applicant, discloses a mold-releasing agent comprising a polyfluoroalkyl phosphonic acid represented by the following general formula or a salt thereof as an active ingredient:

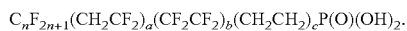

In this case, the polyfluoroalkyl phosphonic acid is obtained by subjecting the corresponding polyfluoroalkyl phosphonic acid dialkyl ester to a hydrolysis reaction.

PRIOR ART DOCUMENT

Patent Document

Patent Document 1: JP-B-53-23270
Patent Document 2: JP-B-53-23271
Patent Document 3: JP-B-57-48035
Patent Document 4: JP-B-3-78244
Patent Document 5: JP-B-4-4923
Patent Document 6: JP-B-4-11366
Patent Document 7: WO 2010/104065 A1
Patent Document 8: WO 2007/105633 A1
Patent Document 9: WO 2009/034773 A1

OUTLINE OF THE INVENTION

Problem to be Solved by the Invention

An object of the present invention is to provide a polyfluoroalkyl phosphoric acid ester or a salt thereof, which that can be easily synthesized without passing through dialkyl ester as in the case of phosphonic acid, and a mold-releasing agent comprising the same as an active ingredient.

Means for Solving the Problem

The present invention provides a polyfluoroalkyl phosphoric acid ester represented by the general formula:

     [I]

wherein n is an integer of 1 to 6, a is an integer of 1 to 4, b is an integer of 1 to 3, c is an integer of 1 to 3, and m is an integer of 1 to 3, or a salt thereof. The polyfluoroalkyl phosphoric acid ester represented by the general formula [I] is produced by subjecting a polyfluoroalkyl alcohol represented by the general formula:

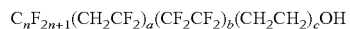     [II]

wherein n is an integer of 1 to 6, a is an integer of 1 to 4, b is an integer of 1 to 3, and c is an integer of 1 to 3; to a dehydration condensation reaction with phosphoric acid.

Effect of the Invention

The polyfluoroalkyl phosphoric acid ester [I] according to the present invention can be easily synthesized only by subjecting a polyfluoroalkyl alcohol represented by the general formula [II] to a dehydration condensation reaction with phosphoric acid.

Also when the obtained polyfluoroalkyl phosphoric acid ester or a salt thereof is prepared, for example, as an aqueous or organic solvent solution having a concentration of about 0.1 wt. % or less and applied to an object to be released (e.g., a molding mold), it exhibits an excellent effect such as effective mold release performance.

EMBODIMENTS FOR CARRYING OUT THE INVENTION

The polyfluoroalkyl alcohol [II] phosphor with phosphoric acid is described in Patent Document 8, and examples thereof include the following compounds:

$CF_3(CH_2CF_2)(CF_2CF_2)(CH_2CH_2)OH$ $C_2F_5(CH_2CF_2)(CF_2CF_2)(CH_2CH_2)OH$ $C_2F_5(CH_2CF_2)(CF_2CF_2)(CH_2CH_2)_2OH$ $C_2F_5(CH_2CF_2)_2(CF_2CF_2)(CH_2CH_2)OH$

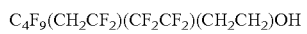

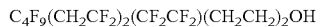

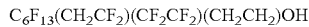

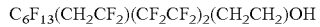

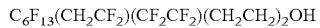

The polyfluoroalkyl alcohol [II] and phosphoric acid are generally used in equimolar amounts. In this case, a mixture of monoester (m=1) and diester (m=2) is formed at a molar ratio of about 8 to 7:2 to 3.

The reaction between them is performed by stirring at about 80 to 150° C. for about 3 to 48 hours, and the collected solid matters are dried by heating under reduced pressure to thereby obtain a product.

The obtained polyfluoroalkyl phosphoric acid ester can be also used in the form of a salt after neutralization. The salt can be generally formed by titration with a salt-forming reactant, such as sodium hydroxide, ammonium hydroxide, zinc sulfate, zinc acetate, zinc oxide, triethylamine, morpholine, triethanolamine, or tris(2-hydroxyethyl), while identifying the equivalence point by the pH, to form an acidic mono-, di- or trivalent metal salt, amine salt, or ammonium salt.

Examples of the polyfluoroalkyl phosphoric acid ester salt thus obtained include a sodium, potassium, lithium, barium, magnesium, calcium, zinc, and other metal salt of the polyfluoroalkyl phosphoric acid ester; an ammonium salt of the polyfluoroalkyl phosphoric acid ester; an ammonium salt of the polyfluoroalkyl phosphoric acid ester substituted by an alkyl or cycloalkyl group, such as monoethyl, monoisopropyl, diethyl, dicyclohexyl, and triethyl; an ammonium salt of the polyfluoroalkyl phosphoric acid ester substituted by a hydroxyalkyl group, such as monoethanol, diethanol, triethanol, and diisopropanol; and the like.

The preparation of a mold-releasing agent using the polyfluoroalkyl phosphoric acid ester or a salt thereof can be carried out by diluting it with water or organic solvent so as to get an aqueous solution, aqueous dispersion, or organic solvent solution having a solid matters content of about 0.01 to 30 wt. %, preferably about 0.05 to 3 wt. %. Examples of usable organic solvent include at least one of alcohols, such as methanol, ethanol, n-propanol, and isopropanol; ketones, such as acetone, methyl ethyl ketone, and methyl isobutyl ketone; ethers, such as diethyl ether, diisopropyl ether, dioxane, and tetrahydrofuran; esters, such as ethyl acetate and butyl acetate; polyvalent alcoholic derivatives, such as methyl cellosolve, ethyl cellosolve, methyl carbitol, and ethyl carbitol; halogenated hydrocarbons, such as carbon tetrachloride, methylene chloride, trichloroethylene, perchloroethylene, trichloroethane, trichlorofluoromethane, tetrachlorodifluoroethane, and trichlorotrifluoroethane; and the like. Preferably, a mixed solvent of isopropanol and ethanol is used. Here, the organic solvent can be used in combination with water.

The mold-releasing agent solution may contain, if necessary, various ionic and non-ionic surfactants for improving the wetting property of the mold-releasing agent; silicone oil, silicone varnish, etc., for further improving mold releasability and lubricity.

The mold-releasing agent solution can be applied to a mold by any common method such as dipping, spraying, brushing, aerosol spraying, or impregnated fabric coating. Moreover, examples of molding material to be molded with a mold to which the mold-releasing agent is applied include resins, such as polyurethane, polycarbonate, epoxy resin, phenol resin, polyimide resin and vinyl chloride resin, and rubbers, such as natural rubber, chloroprene rubber and fluororubber, and the like.

EXAMPLES

The following describes the present invention with reference to Examples.

Example 1

100 g (0.23 mol) of the compound:

obtained in Example 1 of Patent Document 8 and 26.5 g (0.23 mol) of phosphoric acid (about 85%) were charged in a 300-ml four-necked flask equipped with a thermometer, a condenser, and a Dean-Stark apparatus. After stirring at an internal temperature of 110° C. for 24 hours, 110 g of solid matters were collected. The solid matters were dried by heating under reduced pressure, thereby obtaining 106.8 g (yield: 91.4%) of product.

From the results of $^1$H-NMR and $^{19}$F-NMR, it was confirmed that the product was mixture of compounds represented by the following formulae:

$$CF_3(CF_2)_3(CH_2CF_2)(CF_2CF_2)(CH_2CH_2)OP(O)(OH)_2 \quad [Ia]$$

$$[CF_3(CF_2)_3(CH_2CF_2)(CF_2CF_2)(CH_2CH_2)O]_2P(O)(OH) \quad [Ib]$$

$^1$H-NMR(acetone-d6, TMS): δ3.56(C$\underline{H}_2$CF$_2$)

2.68(CF$_2$C$\underline{H}_2$CH$_2$)

4.33(CF$_2$CH$_2$C$\underline{H}_2$)

$^{19}$F-NMR(acetone-d6, C$_6$F$_6$): δ−80.2(C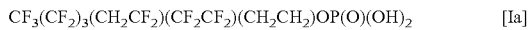

−124.9(CF$_3$C$\underline{F}_2$CF$_2$CF$_2$CH$_2$CF$_2$CF$_2$CF$_2$—)

−120 to 123(CF$_3$CF$_2$C$\underline{F}_2$CF$_2$CH$_2$CF$_2$CF$_2$CF$_2$—)

−112.3(CF$_3$CF$_2$CF$_2$C$\underline{F}_2$CH$_2$CF$_2$CF$_2$CF$_2$—)

−109.5(CF$_3$CF$_2$CF$_2$CF$_2$CH$_2$C$\underline{F}_2$CF$_2$CF$_2$—)

−120 to 123(CF$_3$CF$_2$CF$_2$CF$_2$CH$_2$CF$_2$C$\underline{F}_2$CF$_2$—)

−110.3(CF$_3$CF$_2$CF$_2$CF$_2$CH$_2$CF$_2$CF$_2$C$\underline{F}_2$—)

Moreover, it was confirmed that the mixing ratio of the compounds [Ia] and [Ib] was 7:3 with respect to the molar ratio by means of a titration method.

Example 2

100 g (0.19 mol) of the compound:

$$CF_3(CF_2)_3(CH_2CF_2)(CF_2CF_2)_2(CH_2CH_2)OH \text{ (95.3 GC\%)}$$

obtained in Example 2 of Patent Document 8 and 21.9 g (0.19 mol) of phosphoric acid (about 85%) were charged in the four-necked flask used in Example 1. The subsequent procedure was the same as in Example 1, thereby obtaining 113 g of solid matters and 107.5 g (yield: 93.6%) of product.

$$CF_3(CF_2)_3(CH_2CF_2)(CF_2CF_2)_2(CH_2CH_2)OP(O)(OH)_2 \quad [Ic]$$

$$[CF_3(CF_2)_3(CH_2CF)(CF_2CF_2)_2(CH_2CH_2)O]_2P(O)(OH) \quad [Id]$$

$^1$H-NMR(acetone-d6, TMS): δ3.56(C$\underline{H}_2$CF$_2$)

2.68(CF$_2$C$\underline{H}_2$CH$_2$)

4.33(CF$_2$CH$_2$C$\underline{H}_2$)

$^{19}$F-NMR(acetone-d6, C$_6$F$_6$): δ−80.2(C$\underline{F}_3$CF$_2$CF$_2$CF$_2$CH$_2$CF$_2$CF$_2$CF$_2$CF$_2$—)

−124.9(CF$_3$C$\underline{F}_2$CF$_2$CF$_2$CH$_2$CF$_2$CF$_2$CF$_2$CF$_2$—)

−120 to 123(CF$_3$CF$_2$C$\underline{F}_2$CF$_2$CH$_2$CF$_2$CF$_2$CF$_2$CF$_2$—)

−112.3(CF$_3$CF$_2$CF$_2$C$\underline{F}_2$CH$_2$CF$_2$CF$_2$CF$_2$CF$_2$—)

−110.3(CF$_3$CF$_2$CF$_2$CF$_2$CH$_2$C$\underline{F}_2$CF$_2$CF$_2$CF$_2$—)

−120 to 123(CF$_3$CF$_2$CF$_2$CF$_2$CH$_2$CF$_2$C$\underline{F}_2$CF$_2$CF$_2$—)

−120 to 123(CF$_3$CF$_2$CF$_2$CF$_2$CH$_2$CF$_2$CF$_2$C$\underline{F}_2$CF$_2$—)

−120 to 123(CF$_3$CF$_2$CF$_2$CF$_2$CH$_2$CF$_2$CF$_2$CF$_2$C$\underline{F}_2$—)

−110.3(CF$_3$CF$_2$CF$_2$CF$_2$CH$_2$CF$_2$CF$_2$CF$_2$CF$_2$C$\underline{F}_2$—)

Moreover, it was confirmed that the mixing ratio of the compounds [Ic] and [Id] was 7:3 with respect to the molar ratio by means of a titration method.

Example 3

100 g (0.19 mol) of the compound:

$$CF_3(CF_2)_3(CH_2CF_2)_2(CF_2CF_2)(CH_2CH_2)OH \text{ (95.5 GC\%)}$$

obtained in Reference Example 6 of Patent Document 9 and 21.9 g (0.19 mol) of phosphoric acid (about 85%) were charged in the four-necked flask used in Example 1. The subsequent procedure was the same as in Example 1, thereby obtaining 114 g of solid matters and 101.4 g (yield: 91.3%) of product.

$$CF_3(CF_2)_3(CH_2CF_2)_2(CF_2CF_2)(CH_2CH_2)OP(O)(OH)_2 \quad [Ie]$$

$$[CF_3(CF_2)_3(CH_2CF_2)_2(CF_2CF_2)(CH_2CH_2)O]_2P(O)(OH) \quad [If]$$

$^1$H-NMR(acetone-d6, TMS):δ

2.84(C$\underline{H}_2$CF$_2$CH$_2$CF$_2$)

2.89(CH$_2$CF$_2$C$\underline{H}_2$CF$_2$)

2.75(CF$_2$C$\underline{H}_2$CH$_2$)

4.21(CF$_2$CH$_2$C$\underline{H}_2$)

$^{19}$F-NMR(acetone-d6, C$_6$F$_6$):δ

−81.9(C$\underline{F}_3$CF$_2$CF$_2$CF$_2$CH$_2$CF$_2$CH$_2$CF$_2$CF$_2$CH$_2$CH$_2$—)

−125.5(CF$_3$C$\underline{F}_2$CF$_2$CF$_2$CH$_2$CF$_2$CH$_2$CF$_2$CF$_2$CH$_2$CH$_2$—)

−122 to 125(CF$_3$CF$_2$C$\underline{F}_2$CF$_2$CH$_2$CF$_2$CH$_2$CF$_2$CF$_2$CH$_2$CH$_2$—)

−113.0(CF$_3$CF$_2$CF$_2$C$\underline{F}_2$CH$_2$CF$_2$CH$_2$CF$_2$CF$_2$CH$_2$CH$_2$—)

−112.2(CF$_3$CF$_2$CF$_2$CF$_2$CH$_2$C$\underline{F}_2$CH$_2$CF$_2$CF$_2$CH$_2$CH$_2$—)

−111.5(CF$_3$CF$_2$CF$_2$CF$_2$CH$_2$CF$_2$CH$_2$C$\underline{F}_2$CF$_2$CH$_2$CH$_2$—)

−122 to 125(CF$_3$CF$_2$CF$_2$CF$_2$CH$_2$CF$_2$CH$_2$CF$_2$C$\underline{F}_2$CH$_2$CH$_2$—)

−111.5(CF$_3$CF$_2$CF$_2$CF$_2$CH$_2$CF$_2$CH$_2$CF$_2$C$\underline{F}_2$CH$_2$CH$_2$—)

Moreover, it was confirmed that the mixing ratio of the compounds [Ie] and [If] was 4:1 with respect to the molar ratio by means of a titration method.

Example 4

100 g (0.24 mol) of the compound:

$$CF_3(CF_2)(CH_2CF_2)_2(CF_2CF_2)(CH_2CH_2)OH \text{ (95.0 GC\%)}$$

obtained in Reference Example 8 of Patent Document 9 and 27.7 g (0.24 mol) of phosphoric acid (about 85%) were charged in the four-necked flask used in Example 1. The subsequent procedure was the same as in Example 1, thereby obtaining 112.9 g of solid matters and 101.8 g (yield: 89.1%) of product.

$$CF_3(CF_2)(CH_2CF_2)_2(CF_2CF_2)(CH_2CH_2)OP(O)(OH)_2 \quad [Ig]$$

$$[CF_3(CF_2)(CH_2CF_2)_2(CF_2CF_2)(CH_2CH_2)O]_P(O)(OH) \quad [Ih]$$

$^1$H-NMR(acetone-d6, TMS):δ

2.82(C$\underline{H}_2$CF$_2$CH$_2$CF$_2$)

2.85(CH$_2$CF$_2$C$\underline{H}_2$CF$_2$)

2.75(CF$_2$C$\underline{H}_2$CH$_2$)

4.25(CF$_2$CH$_2$C$\underline{H}_2$)

$^{19}$F-NMR(acetone-d6, C$_6$F$_6$):δ

−87.3(C$\underline{F}_3$CF$_2$CH$_2$CF$_2$CH$_2$CF$_2$CF$_2$CF$_2$CH$_2$CH$_2$—)

−116.5(CF$_3$C$\underline{F}_2$CH$_2$CF$_2$CH$_2$CF$_2$CF$_2$CF$_2$CH$_2$CH$_2$—)

−112.1(CF$_3$CF$_2$CH$_2$C$\underline{F}_2$CH$_2$CF$_2$CF$_2$CF$_2$CH$_2$CH$_2$—)

−113.2(CF$_3$CF$_2$CH$_2$CF$_2$CH$_2$C$\underline{F}_2$CF$_2$CF$_2$CH$_2$CH$_2$—)

−124.0(CF$_3$CF$_2$CH$_2$CF$_2$CH$_2$CF$_2$C$\underline{F}_2$CF$_2$CH$_2$CH$_2$—)

−112.6(CF$_3$CF$_2$CH$_2$CF$_2$CH$_2$CF$_2$CF$_2$C$\underline{F}_2$CH$_2$CH$_2$—)

Moreover, it was confirmed that the mixing ratio of the compounds [Ig] and [Ih] was 4:1 with respect to the molar ratio by means of a titration method.

Example 5

After 50 parts (by weight; hereinafter the same) of isopropanol was added to 20 parts of the product (polyfluoroalkyl phosphoric acid ester mixture) obtained in Example 2, 26 parts of ion-exchanged water was added, and neutralization was performed with 4 parts of triethylamine. The resultant was diluted with water to prepare an aqueous solution having a solid matters content of 0.1 wt. %, thereby preparing a mold-releasing agent.

Using this mold-releasing agent, a mold release test during urethane rubber molding was performed in the following manner:

A SUS cup (diameter: 45 mm, depth: 50 mm) was used as a mold. After the mold was heated to 80° C., the mold-releasing agent was applied to the cup surface, and dried at 120° C. 10 g of a mixture of 100 parts of polyurethane prepolymer (Coronate 4090, produced by Nippon Polyurethane Industry Co., Ltd.) heated to 85° C. and 14.5 parts of methylene-bis-o-chloroaniline curing agent (Iharacuamine MT, produced by Ihara Chemical Industry Co., Ltd.) heated to 120° C. was injected into the mold coated with the mold-releasing agent, and cured by heating at 120° C. for 1.5 hours.

Before heat curing, a hook for taking out a cured molded product was placed in the center of the injection part. After curing, the hook was pulled to take out the molded product, and the load was calculated with a spring balance positioned above. The resulting value was 18 N (mold release performance).

Comparative Example 1

In Example 5, when the mold release test was performed without applying the mold-releasing agent to the SUS cup, the rubber stuck to the SUS cup and the mold release could not be done.

Comparative Example 2

In Example 5, when the mold release performance was determined using the polyfluoroalkyl phosphonic acid diethyl ester:

$CF_3(CF_2)_3(CH_2CF_2)(CF_2CF_2)_2(CH_2CH_2)P(O)(OCH_2CH_3)_2$ (96 GC%) obtained in Example 1 of Patent Document 7, in place of the product (polyfluoroalkyl phosphoric acid ester) obtained in Example 2, the resulting value was 34 N.

The invention claimed is:

1. A polyfluoroalkyl phosphoric acid ester represented by the general formula:

$$[C_nF_{2n+1}(CH_2CF_2)_a(CF_2CF_2)_b(CH_2CH_2)_cO]_mP(O)(OH)_{3-m} \quad [I]$$

wherein n is an integer of 1 to 6, a is an integer of 1 to 4, b is an integer of 1 to 3, c is an integer of 1 to 3, and m is an integer of 1 to 3, or a salt thereof.

2. The polyfluoroalkyl phosphoric acid ester or a salt thereof according to claim 1, which is a mixture of monoester of the general formula [I] wherein m is 1, and diester of the general formula [I] wherein m is 2.

3. A method for producing the polyfluoroalkyl phosphoric acid ester according to claim 1, comprising subjecting a polyfluoroalkyl alcohol represented by the general formula:

$$C_nF_{2n-1}(CH_2CF_2)_a(CF_2CF_2)_b(CH_2CH_2)_cOH \quad [II]$$

wherein n is an integer of 1 to 6, a is an integer of 1 to 4, b is an integer of 1 to 3, and c is an integer of 1 to 3; to a dehydration condensation reaction with phosphoric acid.

4. A mold-releasing agent comprising the polyfluoroalkyl phosphoric acid ester or a salt according to claim 1 as an active ingredient.

5. A method for producing the polyfluoroalkyl phosphoric acid ester according to claim 2, comprising subjecting a polyfluoroalkyl alcohol represented by the general formula:

$$C_nF_{2n+1}(CH_2CF_2)_a(CF_2CF_2)_b(CH_2CH_2)_cOH \quad [II]$$

wherein n is an integer of 1 to 6, a is an integer of 1 to 4, b is an integer of 1 to 3, and c is an integer of 1 to 3; to a dehydration condensation reaction with phosphoric acid.

6. A mold-releasing agent comprising the polyfluoroalkyl phosphoric acid ester or a salt according to claim 2 as an active ingredient.

* * * * *